W. H. UPDEGRAFF.
SAW FILING DEVICE.
APPLICATION FILED DEC. 2, 1911.
1,036,167.
Patented Aug. 20, 1912.
4 SHEETS—SHEET 1.
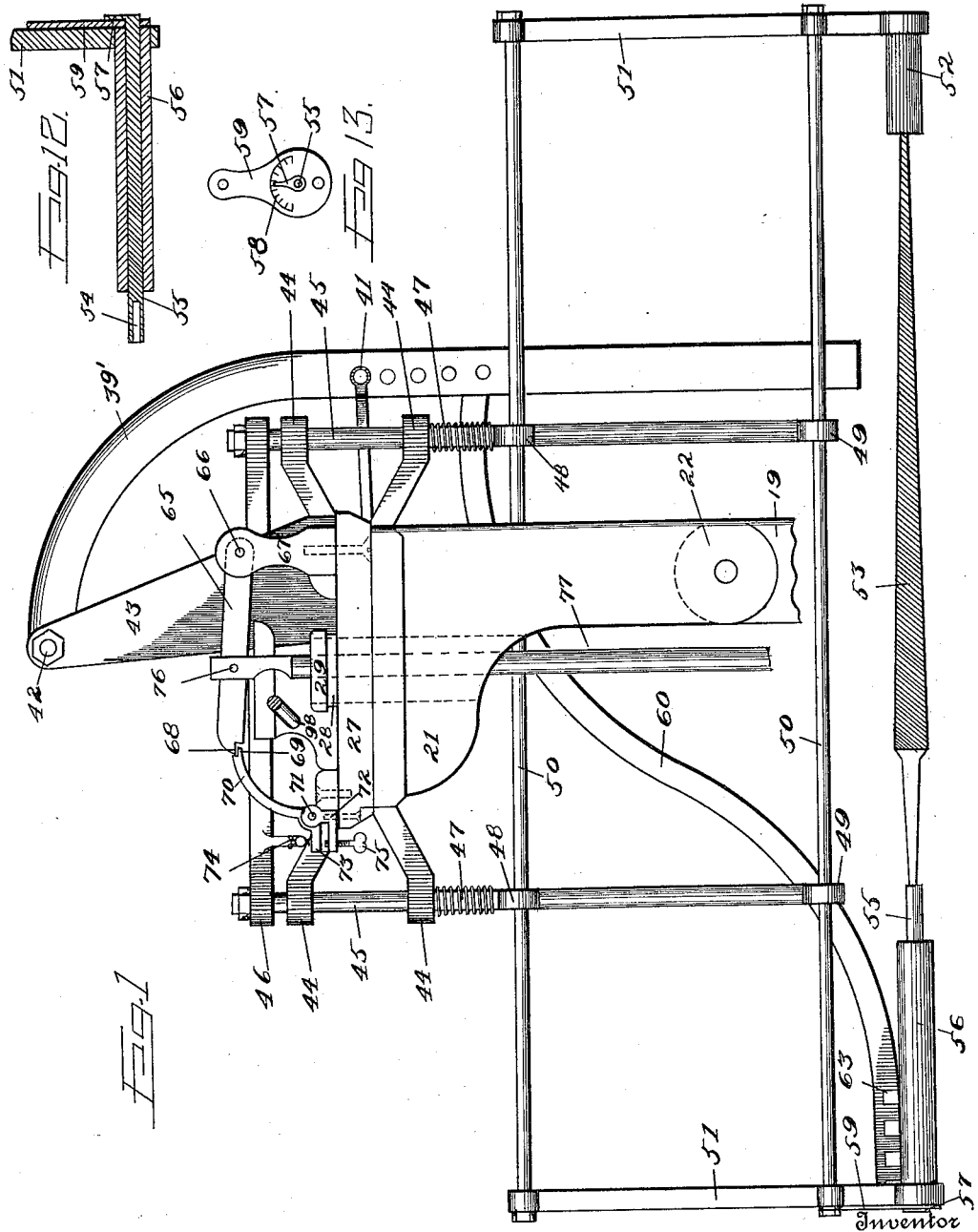
Witnesses
Nevelle Lyles
C. L. Schmidt
Inventor
William H. Updegraff
By Shepherd Campbell
Attorneys

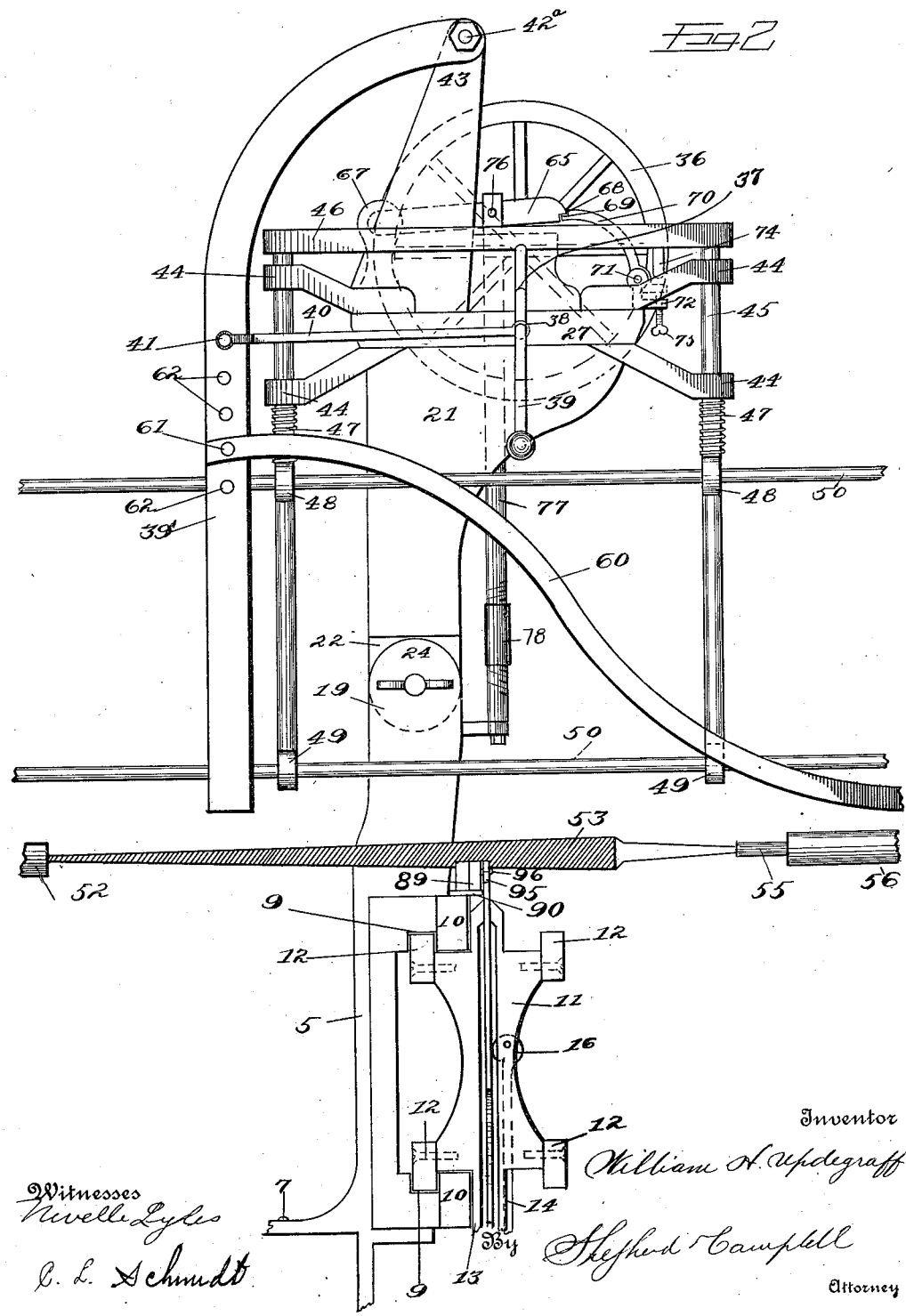

W. H. UPDEGRAFF.
SAW FILING DEVICE.
APPLICATION FILED DEC. 2, 1911.
1,036,167.
Patented Aug. 20, 1912.
4 SHEETS—SHEET 3.
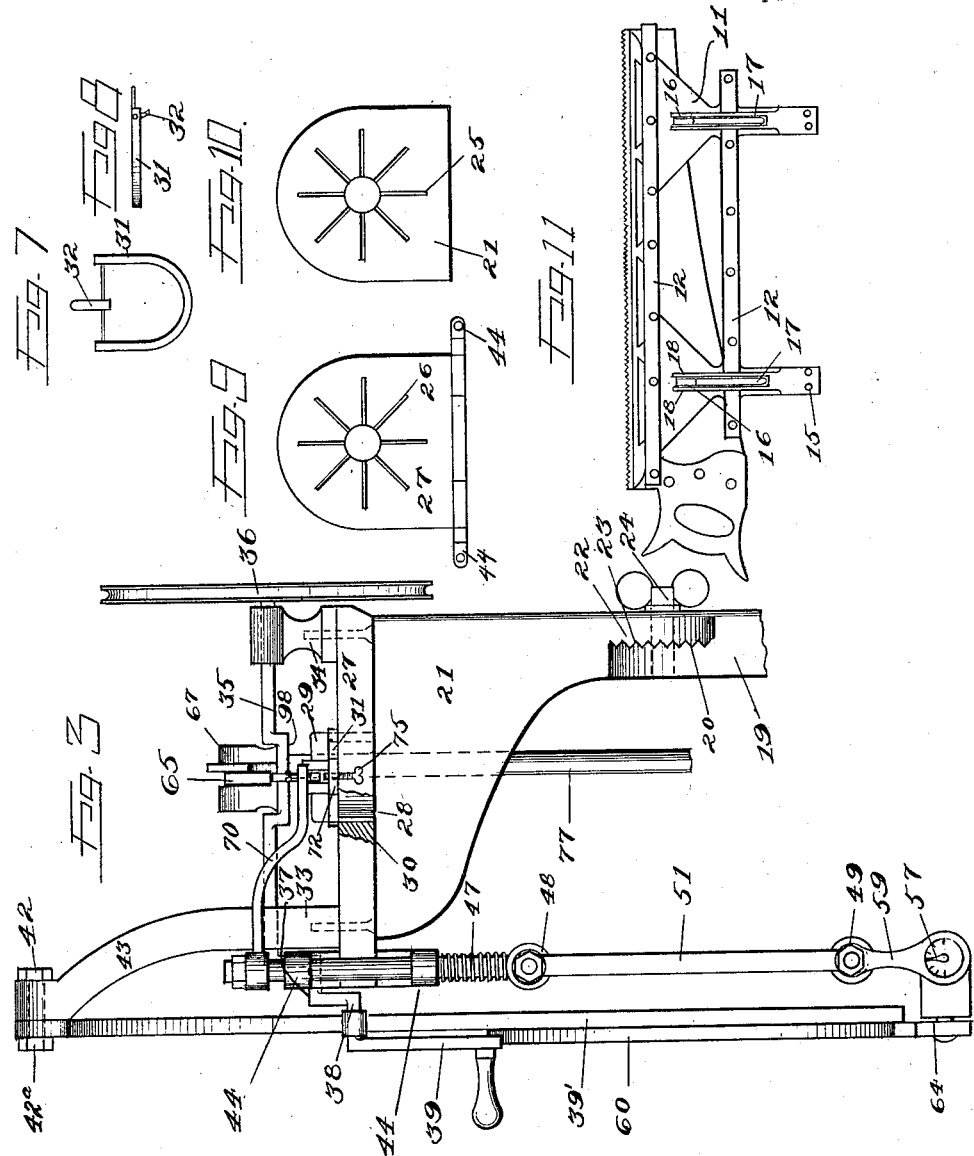
Witnesses
Nevelle Lyles
C. L. Schmidt
Inventor
William H. Updegraff
By Shepherd & Campbell
Attorneys

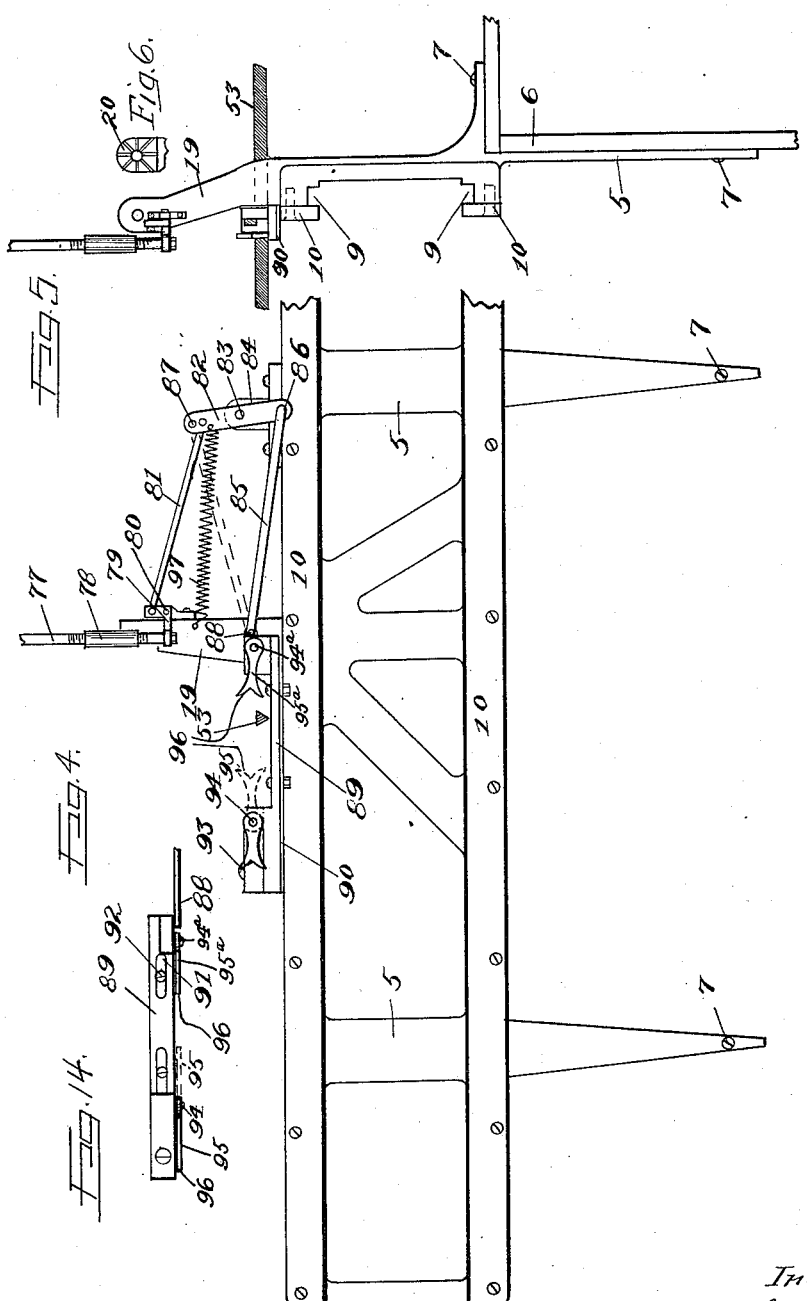

UNITED STATES PATENT OFFICE.

WILLIAM H. UPDEGRAFF, OF SAN DIEGO, CALIFORNIA.

SAW-FILING DEVICE.

1,036,167.   Specification of Letters Patent.   Patented Aug. 20, 1912.

Application filed December 2, 1911.  Serial No. 663,553.

*To all whom it may concern:*

Be it known that I, WILLIAM H. UPDE-GRAFF, a citizen of the United States of America, residing at San Diego, in the county of San Diego and State of California, have invented certain new and useful Improvements in Saw-Filing Devices, of which the following is a specification.

This invention relates to a saw filing machine.

The object of the invention is to provide a machine of this character adapted to be either hand or power driven, and which when set in motion feeds the saw along tooth by tooth to the file, and imparts the requisite reciprocatory movement to the file.

It is a further object of the invention to provide a machine adapted to perform the above named functions while permitting the file to be swung at varying angles and to varying inclinations.

Further objects and advantages of the invention will be set forth in the detailed description which now follows.

In the accompanying drawing Figure 1 is a side elevation of the upper portion of the saw filing machine. Fig. 2 is a like view looking from the opposite side of said machine and illustrating the saw carrying carriage in end elevation. Fig. 3 is an end view looking toward the left in Fig. 2. Figs. 4 and 5 are respectively side and end elevations of the saw carrying carriage guide. Fig. 6 is a detailed view illustrating the toothed head of a bracket, as hereinafter described. Figs. 7 and 8 are respectively plan and edge views of a locking yoke, hereinafter described. Fig. 9 is an underside view of the upper plate, upon which the main operating shaft is mounted. Fig. 10 is a plan view of the standard upon which the plate shown in Fig. 9 has its mounting. Fig. 11 is a detailed side elevation of the saw carriage, hereinafter described. Fig. 12 is a detailed sectional view illustrating the center in which one end of the file is mounted. Fig. 13 is a detailed end elevation illustrating a pointer used in setting the file to varying positions, and Fig. 14 is a detailed plan view of the plate upon which the saw shifting dog is mounted.

Like numerals designate corresponding parts in all of the figures of the drawing.

Referring to the drawing, the numeral 5 designates a bracket adapted to be secured to a bench 6, or other support, by means of screws or like fastening devices, 7. An intermediate portion of the bracket has ways 9 formed therein by securing strips 10 to said bracket. In the ways 9 a saw carrying carriage 11 is mounted for longitudinal movement, the carriage 11 having secured thereto bars 12, adapted to engage in the ways 9. The carriage 11 is made in the two parts 13 and 14, secured together at 15 by rivets or screws. Cams 16 having handle extensions 17, are pivoted between ears 18 of the carriage, and serve to frictionally bind the saw in said carriage to hold the saw against accidental movement. The bracket 5 is provided with an upstanding neck extension 19, having a serrated face 20 at its upper end, (see Figs. 3 and 6). A head block 21 is provided with an extension 22, having a serrated face 23, which coacts with the face 20. A binding screw 24 serves to bind these serrated faces into engagement with each other to prevent movement of the block 21, after said block has been moved to any desired position of angular adjustment. The block 21 has its upper face radially grooved at 25 for the reception of radial ribs 26 formed upon the under face of a head plate 27. The block 21 is provided with an upstanding neck 28 terminating in a head 29, and the plate 27 is provided with an opening 30 through which the head 29 is passed when it is desired to secure these parts together. After these parts have been brought into the position illustrated in Fig. 3, a U shaped yoke 31 is placed in position embracing the neck 28, engaging beneath the head 29 and bearing upon the plate 27, whereby the plate 30 is secured upon the head 21. If desired, the U-shaped yoke 31 may be merely driven in position, or the yoke may be provided with a cam finger 32, (see Figs. 7 and 8), which when brought to the position illustrated in Fig. 8 throws the rear end of the yoke upwardly and exerts pressure between the underside of the head 29 and the upper face of the plate 27. The plate 27 carries bearing blocks 33 and 34, in which is journaled a main shaft 35. This shaft may be provided with a pulley 36 if desired, for the purpose of imparting motion to said shaft by power. At its opposite end the shaft 35 is provided with the two offset portions 37 and 38, and with a crank handle 39. Pivotally engaged with the offset 38, and extending from said offset to a swinging arm 39′, is a link 40. The link 40 has pivotal engagement at 41 with the arm 39′, which latter arm has a pivotal mounting at 42 upon a standard 43, which projects upwardly from head plate 27. The head plate 27 carries bearing arms 44, in which rods 45 slide vertically. The upper ends of these rods are connected by a tie-bar 46. Springs 47 bear beneath the underside of the lowermost part of the arms 44 and bearing enlargements 48 of the rods 45. The bearing enlargements 48 and additional bearings or enlargements 49 of the rods 45 receive horizontal rods 50, forming portions of a filing frame, the rods 50 being slidably disposed in the enlargements 48 and 49.

The file frame comprises the rods 50 and end members 51, to which said rods are secured. One of the members 51 (see Fig. 1) carries a fixed center 52, which serves to receive one end of the file 53. The opposite end of the file enters a socket 54 (see Fig. 12) of a rotatable center 55, said center being mounted in a sleeve 56 that is carried by one of the end members 51. The center 55 carries a pointer 57 which travels over a scale 58 of plate 59, and the angle of the file is determined by the position of this pointer, it being understood that the file is a three cornered one, as illustrated in Fig. 4. It will be apparent that when rotation is imparted to shaft 35, either by the pulley 36 or handle 39, swinging motion will be imparted to arm 39′ through the medium of link 40. This will in turn impart reciprocatory movement to the file frame through the medium of a curved link 60 adapted for pivotal connection at 61 with the arm 39 at any of the points 62. The opposite end of the link 60 (see Fig. 1) is provided with recesses 63 adapted for engagement with the stud 64 projecting from one side of the sleeve 56. By virtue of this structure, the throw of the file frame may be varied at will.

It is to be understood that the file is in contact with a tooth until the tooth is filed to a predetermined depth. The settling of the file actuates mechanism for bringing forward another tooth of the saw to be operated upon. Means are also provided for lifting the file out of contact with the tooth upon each rearward movement of the file frame. The means for feeding the saw forward tooth by tooth comprises a lever 65 that is pivoted at 66, upon a bearing bracket 67 supported from the head plate 27. The lever 65 is provided with a nose 68 adapted to be engaged by the end 69 of a latch 70. This latch is pivoted at 71 to a bracket 72 carried by plate 27. The latch 70 is provided with a tail 73 that lies in the path of downward movement of an arm 74 carried by tie-rod 46. A set screw 75 limits the downward movement of the tail 73.

It will be apparent that as the file cuts into the saw and the groove between the teeth is deepened, there will be a gradual settling of the file frame, which, when the file has cut to a predetermined depth, will, through the contact of arm 74 with tail 73, throw the end 69 out of engagement with the nose 68 of lever 65, thereby permitting downward movement of said lever. This lever has pivoted to it at 76, a rod 77, which intermediate its ends is provided with a turn-buckle sleeve 78 to permit of adjustment of said rod for use with a fine or coarse saw as the case may be. The lower end of the rod 77 is secured to one of the arms of a bell-crank lever 79, that is pivoted at 80. The opposite arm of the bell-crank lever is connected by a link 81 with the upper end of a rocking lever 82. This rocking lever is pivoted at 83 upon a bearing plate 84 of bracket 5. A link 85 is adapted to be connected with the rocking lever either at 86 or 87, the opposite end of said link being connected at 88 to a sliding plate 89 (see Figs. 4 and 14). The sliding plate 89 rests upon a fixed plate 90, and is provided with slots 91 for the reception of screws 92, which pass through plates 89 and 90, and while holding plate 89 upon the plate 90, permits sliding movement of plate 89 with relation to plate 90. The plate 89 carries a block 93, upon which is pivoted at 94 and 94ᵃ a dog 95 and 95ᵃ, having fish tail ends 96. A spring 97 extends between the bracket 19 and the rocking lever 82.

It is apparent that downward movement of the rod 77 will rock the bell crank lever 79 upon its pivot. It is to be understood that the tail end of the dog 95 will thereupon ride over the teeth of the saw a distance equal to two of the teeth and engage with the second tooth. This movement, it is apparent, is brought about by the combined weight of rod 77 and the action of a spring 97. The shaft 35 intermediate its ends is provided with a crank member 98, which, in its rotation, strikes the underside of the lever 65 and throws said lever upwardly, which action brings the saw forward the distance of two teeth and permits the latch 70 to again engage the nose 68 of said lever 65, preparatory to again repeating the operation of advancing a saw the distance of two teeth. In case the saw is to be filed all from one side, adjustment of sleeve 78 permits the above actions to advance the saw only one tooth at a time.

It will be apparent from an inspection of Fig. 2, that during the return stroke of the file, the offset portion 37 of the shaft 35 will engage the underside of the tie-bar 46 to hold the file frame and the file in an elevated position and out of contact with the teeth of the saw, but as the handle 39 is moved to carry the file forward on its working stroke, the file frame and file are permitted to descend gradually and contact with the saw. After the saw carrying carriage has reached its limit of movement in one direction, the link 85 is moved to the dotted line position in Fig. 4, and the dog 95 is likewise moved to the dotted line position in said figure, and the saw carrying carriage reversed in its ways, it being apparent that when this is done, movement in the opposite direction will be imparted to the saw frame, it being understood that upon such reverse movement, the teeth that were not filed in the first instance, are filed, this being determined by starting the file at the proper tooth to secure such result.

It is apparent that the plate 27 may swing in a horizontal plane upon head block 21 to bring the file at varying angles, and that the block 21 with plate 27 has a swinging adjustment by reason of the structure illustrated at 22, 23 and 24 to permit adjustment of the file to varying inclinations.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:—

1. In a device of the character described, the combination with a saw moving mechanism, a file frame and a file frame reciprocating member, of a rotative shaft having three offset crank portions formed in the length thereof, one of said portions, during the rotation of the shaft, actuating said saw moving mechanism, another of said offsets contacting with and lifting said file frame, and the third of said offsets engaging and actuating said file frame reciprocating member.

2. In a device of the character described, the combination with a saw carrying carriage of a file frame disposed substantially transversely with relation to said carriage, a rotative shaft, means for imparting reciprocatory movement to the file frame from said shaft, vertically movable guides in which the file frame slides, a member, movement of which serves to impart movement to the saw carrying carriage to bring another tooth into position to be acted upon by the file, a latch normally holding said member against such movement and means operable during the downward movement of the file frame guides to release said latch.

3. In a device of the character described, the combination with a saw carrying carriage of a file frame disposed substantially transversely with relation to said carriage, a rotative shaft, means for imparting reciprocatory movement to the file frame from said shaft, vertically movable guides in which the file frame slides, a member, movement of which serves to impart movement to the saw carrying carriage to bring another tooth into position to be acted upon by the file, a latch normally holding said member against such movement, means operable during the downward movement of the file frame guides to release said latch, and means carried by the rotative shaft for restoring such latch to its normal position after the saw carrying carriage has been moved.

4. In a device of the character described, the combination with a saw carrying carriage of a file frame disposed substantially transversely with relation to said carriage, a rotative shaft, means for imparting reciprocatory movement to the file frame from said shaft, vertically movable guides in which the file frame slides, a member, movement of which serves to impart movement to the saw carrying carriage to bring another tooth into position to be acted upon by the file, a latch normally holding said member against such movement, means operable during the downward movement of the file frame guides to release said latch, and means carried by the rotative shaft and contacting with the file frame guides to elevate the said guides and the file frame during the return movement of the file.

5. In a device of the character described, the combination with a supporting head plate of a rotative shaft journaled thereon, a vertically movable file frame guide, a file frame mounted in the file frame guides, means for imparting reciprocatory movement to the file frame from the rotative shaft, an offset portion in said shaft which contacts with the file frame guides to elevate the file frame guides and the file frame during the return movement of the file, a saw carriage, a member, downward movement of which imparts a forward feeding movement to the saw carriage, a latch normally holding said member against downward movement and a projection carried by the file frame guide for releasing said latch when the file frame has moved downward a predetermined distance, and a crank arm carried by said shaft for restoring said latch to normal position after the file frame guide has been moved.

6. In a device of the character described, the combination with a vertically movable file frame of a saw carrying carriage, guides in which said carriage is mounted for longitudinal movement, a plate mounted for sliding movement adjacent said carriage, a dog carried by said plate and adapted to engage with the teeth of a saw held in said carriage, and means actuated by downward movement of the file frame for moving said plate and dog.

7. In a device of the character described, the combination with a vertically movable file frame of a saw carrying carriage, guides in which said carriage is mounted for longitudinal movement, a plate mounted for sliding movement adjacent said carriage, a dog carried by said plate and adapted to engage with the teeth of a saw held in said carriage, means actuated by downward movement of the file frame for moving said plate and dog, said means comprising a vertically movable member, a latch which normally holds said vertical member against movement, a spring actuated rocking-lever, a link connecting the rocking-lever with the plate, a bell-crank lever to one arm of which the lower end of the vertically movable member is connected, a link connecting the other arm of said bell-crank lever with said rocking lever.

8. In a device of the character described, the combination with a supporting bracket having ways formed therein of a saw carrying carriage mounted to travel in said ways, a head block adjustably mounted to tilt upon said bracket, a head plate horizontally adjustable upon the head block, file frame guides supported from the head plate, a file frame mounted for horizontal reciprocation in the file frame guides, a rotative shaft supported upon the head plate, and means for imparting reciprocation to the file frame from said shaft.

9. In a device of the character described, the combination with a supporting bracket having ways formed therein of a saw carrying carriage mounted to travel in said ways, a head block adjustably mounted to tilt upon said bracket, a head plate horizontally adjustable upon the head block, file frame guides, supported from the head plate, a file frame mounted for horizontal reciprocation in the file frame guides, a rotative shaft supported upon the head plate, means for imparting reciprocation to the file frame from said shaft, and means carried by said shaft for elevating the file frame during the reverse movement of the file.

10. In a device of the character described, the combination with a supporting bracket having ways formed therein of a saw carrying carriage mounted to travel in said ways, a head block adjustably mounted to tilt upon said bracket, a head plate horizontally adjustable upon the head block file frame guides, supported from the head plate, a file frame mounted for horizontal reciprocation in the file frame guides, a rotative shaft supported upon the head plate, means for imparting reciprocation to the file frame from said shaft, means carried by said shaft for elevating the file frame during the reverse movement of the file, and means controllable by the downward movement of the file frame guides for imparting movement to the saw carrying carriage to bring another tooth of the saw into position to be acted upon by the file.

In testimony whereof I affix my signature in presence of two witnesses.

WILLIAM H. UPDEGRAFF.

Witnesses:
J. C. HIZAR,
G. U. FRY.

---

Copies of this patent may be obtained for five cents each, by addressing the "Commissioner of Patents, Washington, D. C."